United States Patent
Miyamoto et al.

(10) Patent No.: US 8,694,188 B2
(45) Date of Patent: Apr. 8, 2014

(54) MOTOR TORQUE CONTROL DEVICE

(75) Inventors: Hiroaki Miyamoto, Okazaki (JP);
Yoshiaki Sano, Okazaki (JP); Akira Hashizaka, Okazaki (JP); Yasuyuki Hatsuda, Okazaki (JP); Toshiyuki Matsumi, Nagoya (JP); Norihiko Hatsumi, Anjyo (JP); Takanori Sugimoto, Tsushima (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 73 days.

(21) Appl. No.: 13/275,950

(22) Filed: Oct. 18, 2011

(65) Prior Publication Data

US 2012/0095634 A1     Apr. 19, 2012

(30) Foreign Application Priority Data

Oct. 19, 2010   (JP) .................. 2010-234375

(51) Int. Cl.
  *B60L 3/00*     (2006.01)
  *B60L 15/20*    (2006.01)

(52) U.S. Cl.
  USPC ........................................... 701/22

(58) Field of Classification Search
  USPC ............................................... 701/22
  See application file for complete search history.

(56) References Cited

U.S. PATENT DOCUMENTS

| | | | | |
|---|---|---|---|---|
| 5,467,275 A | * | 11/1995 | Takamoto et al. .......... | 701/70 |
| 5,492,192 A | * | 2/1996 | Brooks et al. ............. | 180/165 |
| 5,707,115 A | * | 1/1998 | Bodie et al. ................ | 303/3 |
| 5,905,349 A | * | 5/1999 | Farkas et al. ............... | 318/432 |
| 6,186,253 B1 | * | 2/2001 | Barnhart et al. .......... | 180/65.245 |
| 6,278,916 B1 | * | 8/2001 | Crombez .................... | 701/22 |
| 6,321,144 B1 | * | 11/2001 | Crombez .................... | 701/22 |
| 6,480,779 B2 | * | 11/2002 | Mardberg ................... | 701/70 |
| 7,340,330 B2 | * | 3/2008 | Okoshi et al. ............... | 701/22 |
| 7,496,435 B2 | * | 2/2009 | Iwatsuki et al. ............ | 701/22 |
| 7,698,044 B2 | * | 4/2010 | Prakash et al. ............. | 701/82 |
| 7,894,968 B2 | * | 2/2011 | Stroh et al. ................. | 701/84 |
| 2010/0036566 A1 | | 2/2010 | Hayami | |
| 2010/0235043 A1 | * | 9/2010 | Seta et al. ................... | 701/34 |
| 2010/0268408 A1 | * | 10/2010 | Yuki ........................... | 701/22 |

FOREIGN PATENT DOCUMENTS

| | | | | |
|---|---|---|---|---|
| CN | 1986304 A | | 6/2007 | |
| JP | 9-84206 A | | 3/1997 | |
| JP | 10304508 A | * | 11/1998 | ........... B60L 7/14 |
| JP | 2001333503 A | * | 11/2001 | ........... B60L 7/24 |

(Continued)

OTHER PUBLICATIONS

Japanese Office Action for Application No. 2010-234375 dated Feb. 6, 2013 with English Translation.

(Continued)

*Primary Examiner* — Behrang Badii
*Assistant Examiner* — David Testardi
(74) *Attorney, Agent, or Firm* — Birch, Stewart, Kolasch & Birch, LLP

(57) ABSTRACT

A motor torque control device of an electrically-driven vehicle equipped with a motor serving as a driving source, is configured to limit an output of the motor when both a brake pedal and an accelerator pedal of the electrically-driven vehicle are stepped. A motor limit torque, which is an upper limit value of a command torque for the motor, is changed depending on a vehicle velocity of the electrically-driven vehicle detected by a vehicle velocity detecting unit and a stepping amount of the brake pedal detected by a brake pedal stepping amount detecting unit.

6 Claims, 2 Drawing Sheets

(56) References Cited

FOREIGN PATENT DOCUMENTS

| JP | 2002-271917 A | 9/2002 |
|----|---------------|--------|
| JP | 2003-199205 A | 7/2003 |
| JP | 2005-253151 A | 9/2005 |
| JP | 2008-92683 A  | 4/2008 |
| JP | 2010-38051 A  | 2/2010 |
| JP | 2012-7567 A   | 1/2012 |
| JP | 2012-7568 A   | 1/2012 |

OTHER PUBLICATIONS

Japanese Office Action for Application No. 2010-234375 dated Aug. 29, 2013 with English language translation.

Chinese Office Action for Application No. 201110318050.0 dated Nov. 5, 2013 with English language translation.

* cited by examiner

MOTOR TORQUE CONTROL DEVICE

BACKGROUND OF THE INVENTION

1. Field of the Invention

The present invention relates to a motor torque control device.

2. Description of the Related Art

An engine vehicle equipped with an engine as a driving source or an electrically-driven vehicle such as an electric vehicle equipped with a motor as a driving source and a hybrid electric vehicle equipped with both a motor and an engine as a driving source, includes a vehicle on which a brake override system is mounted.

In the brake override system of the engine vehicle, an output of the engine is limited when both a brake pedal and an accelerator pedal are stepped. In the brake override system of the electrically-driven vehicle, an output of the motor is limited when both the brake pedal and the accelerator pedal are stepped.

For example, JP-2005-253151A and JP-2002-271917A disclose related-art techniques related to the control of the motor output at a time when both the brake pedal and the accelerator pedal are stepped.

However, in the brake override system of the electrically-driven vehicle in the related art, the motor output at a time when both the brake pedal and the accelerator pedal are stepped is simply limited to a predetermined output and is irrelevant to a vehicle velocity and a stepping amount of the brake pedal.

SUMMARY OF THE INVENTION

It is therefore an object of the invention to provide a motor torque control device capable of limiting a motor output (torque), which can acquire appropriate driving performance depending on a driving condition.

In order to achieve the object, according to the invention, there is provided a motor torque control device of an electrically-driven vehicle equipped with a motor serving as a driving source, wherein the motor torque control device is configured to limit an output of the motor when both a brake pedal and an accelerator pedal of the electrically-driven vehicle are stepped, and a motor limit torque, which is an upper limit value of a command torque for the motor, is changed depending on a vehicle velocity of the electrically-driven vehicle detected by a vehicle velocity detecting unit and a stepping amount of the brake pedal detected by a brake pedal stepping amount detecting unit.

As the stepping amount of the brake pedal increases, the motor limit torque may be adjusted to decrease.

As the vehicle velocity increases, the stepping amount of the brake pedal may be adjusted to decrease at a time when the motor limit torque starts to decrease.

When the stepping amount of the brake pedal is equal to or more than a value, the motor limit torque may be a negative value or zero.

The motor limit torque may be the negative value, and as the stepping amount of the brake pedal increases, an absolute value of the negative value of the motor limit torque may be adjusted to increase.

As the vehicle velocity increases, a maximum value of a negative side of the motor limit torque may be adjusted to increase.

BRIEF DESCRIPTION OF THE DRAWINGS

FIG. 2A shows a motor limit torque map when the vehicle velocity is 100 km/h, FIG. 2B shows a motor limit torque map when the vehicle velocity is 50 km/h, FIG. 2C shows a motor limit torque map when the vehicle velocity is 20 km/h, and FIG. 2D shows a motor limit torque map when the vehicle velocity is 5 km/h.

DETAILED DESCRIPTION OF THE INVENTION

Hereinafter, an exemplary embodiment of the present invention will be described in detail with reference to the accompanying drawings.

Figure 1:
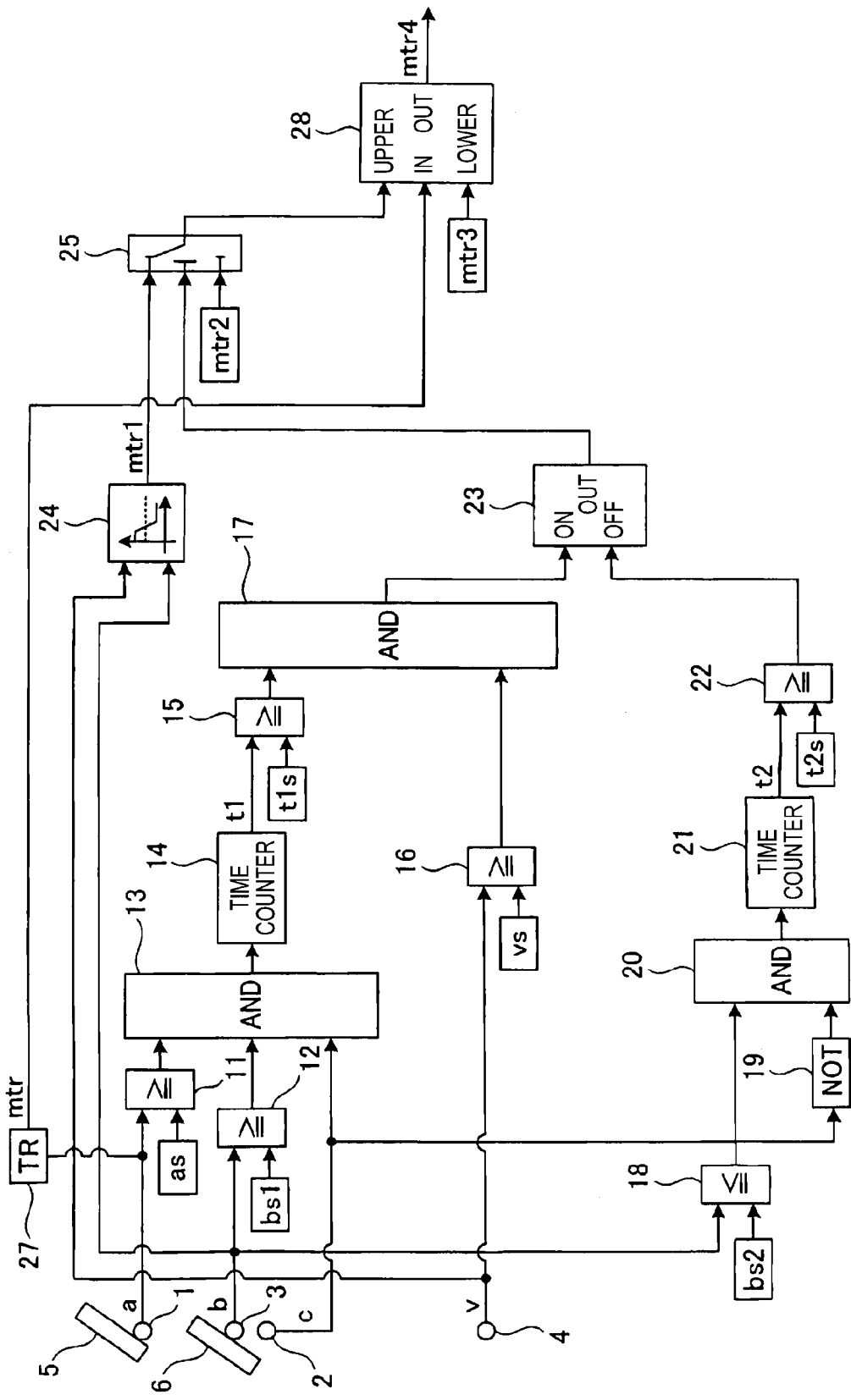
FIG. 1 is a block diagram showing the configuration of a motor torque control device according to an exemplary embodiment of the present invention.

FIG. 1 shows the configuration of a motor torque control device according to an exemplary embodiment of the present invention mounted on an electric vehicle equipped with a motor as a driving source.

As shown in FIG. 1, the electric vehicle includes an accelerator position sensor 1, a brake switch 2, a brake oil pressure sensor 3 which is a brake pedal stepping amount detecting unit, and a vehicle velocity sensor 4 which is a vehicle velocity detecting unit.

The accelerator position sensor 1 detects a stepping amount of an accelerator pedal 5 of an accelerator apparatus mounted on the electric vehicle. The vehicle velocity sensor 4 detects the vehicle velocity of the electric vehicle. The brake switch 2 detects whether or not a brake pedal 6 of a hydraulic brake apparatus mounted on the electric vehicle is stepped.

The brake oil pressure sensor 3 detects a brake oil pressure of the hydraulic brake apparatus. The brake oil pressure increases or decreases depending on the increase or decrease of the stepping amount of the brake pedal 6. That is, the brake oil pressure sensor 3 serves as the brake pedal stepping amount detecting unit and the brake oil pressure corresponds to the brake pedal stepping amount. A stroke sensor detecting a stroke of the brake pedal or a stepping force sensor detecting a stepping force of the brake pedal serves as the brake pedal stepping amount detecting unit. The stroke of the brake pedal is corresponding to the stepping amount of the brake pedal. The stepping force increases or decreases depending on the increase or decrease of the pedal stepping amount of the brake pedal and corresponds to the brake pedal stepping amount. Therefore, in the exemplary embodiment of the present invention, the stepping amount of the brake pedal includes a value corresponding to the stepping amount, such as the brake oil pressure and the stepping force of the brake pedal, in addition to the stepping amount itself such as the stroke of the brake pedal.

Next, based on FIG. 1, the configuration of the motor torque control device will be described. A function of the motor torque control device shown in FIG. 1 is implemented by, for example, software executed by an electronic control unit (ECU) of the electric vehicle.

As shown in FIG. 1, a comparison unit 11 compares an accelerator pedal stepping amount a detected by the accelerator position sensor 1 with a threshold value as of the accelerator pedal stepping amount, and outputs an ON signal (Flag: 1) when the accelerator pedal stepping amount a is equal to or more than the threshold value as. A comparison unit 12 compares a brake oil pressure b detected by the brake oil pressure sensor 3 with a threshold value bs1 of the brake oil pressure, and outputs an ON signal (Flag: 1) when the brake oil pressure b is equal to or more than the threshold value bs1.

When the ON signal outputted from the comparison unit 11, the ON signal outputted from the comparison unit 12, and a brake pedal stepping detection signal c (Flag: 1) outputted from the brake switch 2 are inputted to an AND circuit unit 13, the AND circuit unit 13 outputs an ON signal (Flag: 1). A time counter 14 starts counting time t1 from the time when the ON signal outputted from the AND circuit unit 13 is inputted and outputs the counted time t1. A comparison unit 15 compares the time t1 counted in the time counter 14 with a threshold value t1s of the time, and outputs an ON signal (Flag: 1) when the counted time t1 is equal to or more than the threshold value t1s.

A comparison unit 16 compares a vehicle velocity v detected by the vehicle velocity sensor 4 with a threshold value vs of the vehicle velocity, and outputs an ON signal (Flag: 1) when the vehicle velocity v is equal to or more than the threshold value vs. When the ON signal outputted from the comparison unit 15 and the ON signal outputted from the comparison unit 16 are inputted to an AND circuit unit 17, the AND circuit unit 17 outputs a start signal (Flag: 1) of motor output limitation (brake override).

A comparison unit 18 compares a brake oil pressure b detected by the brake oil pressure sensor 3 with a threshold value bs2 of the brake oil pressure, and outputs an ON signal (Flag: 1) when the brake oil pressure b is equal to or less than the threshold value bs2. A NOT circuit unit 19 outputs an ON signal (Flag: 1) (the flag is inverted from 0 to 1) when the brake pedal stepping detection signal c is not outputted from the brake switch 2 (Flag: 0). When the ON signal outputted from the comparison unit 18 and the ON signal outputted from the NOT circuit unit 19 are inputted to an AND circuit unit 20, the AND circuit unit 20 outputs an ON signal (Flag: 1).

A time counter 21 starts counting time t2 from the time when the ON signal outputted from the AND circuit unit 20 is inputted, and outputs the counted time t2. A comparison unit 22 compares the time t2 counted in the time counter 21 with a threshold value t2s of the time, and outputs an ON signal (Flag: 1) when the counted time t2 is equal to or more than the threshold value t2s.

A torque limit signal outputting unit 23 outputs a torque limit start signal (Flag: 1) when the ON signal outputted from the AND circuit unit 17 is inputted, and outputs a torque limit stop signal (Flag: 0) when the ON signal outputted from the comparison unit 22 is inputted.

That is, the above-described process is to determine whether both the accelerator pedal 5 and the brake pedal 6 are stepped (that is, whether the motor torque limitation is performed by the brake override). When a driver steps both the accelerator pedal 5 and the brake pedal 6, such that the accelerator pedal stepping amount a detected by the accelerator position sensor 1 becomes equal to or more than the threshold value as, and at the same time, the brake pedal stepping detection signal c is outputted from the brake switch 2, and further, the brake oil pressure b detected by the brake oil pressure sensor 3 becomes equal to or more than the threshold value bs1, the torque limit start signal is outputted. As a result, the motor torque limitation by the brake override is started (specifically described below). Meanwhile, when the brake pedal 6 is not stepped, and the brake pedal stepping detection signal c is not outputted from the brake switch 2, and further, the brake oil pressure b detected by the brake oil pressure sensor 3 is equal to or less than the threshold value bs2, the motor torque limit stop signal is outputted. As a result, the motor torque limitation by the brake override is stopped (specifically described below).

Specifically, a motor limit torque switching unit 25 outputs a motor limit torque mtr2 (e.g., 180 N·m), which is set as an upper limit value of the motor torque during usual driving, when the torque limit stop signal outputted from the torque limit signal outputting unit 23 is inputted.

The motor limit torque switching unit 25 outputs a motor limit torque mtr1, which is outputted from a motor limit torque map unit 24, when the motor torque limit start signal outputted from the torque limit signal outputting unit 23 is inputted. Although specifically described below, the motor limit torque map unit 24 adjusts and outputs the motor limit torque mtr1, which is an upper limit value of the motor torque in the brake override, depending on the vehicle velocity v detected by the vehicle velocity sensor 4 and the brake oil pressure b detected by the brake oil pressure sensor 3.

A motor command torque mtr outputted from a motor command torque calculating unit 27 of the accelerator apparatus, the motor limit torque mtr1 or mtr2 outputted from the motor limit torque switching unit 25, and a motor limit torque mtr3 (e.g., −180 N·m), which is set as a lower limit value of the motor torque, are inputted in a motor command torque limiter unit 28.

The motor command torque calculating unit 27 calculates the motor command torque mtr based on the accelerator pedal stepping amount a detected by the accelerator position sensor 1 (the motor command torque mtr which increases or decreases depending on the increase or decrease of the accelerator pedal steeping amount a is calculated).

The motor command torque limiter unit 28 outputs the motor command torque mtr inputted from the motor command torque calculating unit 27 to an inverter (not shown) as the motor command torque mtr4. In this time, the motor command torque limiter unit 28 outputs the motor command torque mtr to the inverter as the motor command torque mtr4 as it is, when the motor command torque mtr is between the motor limit torque mtr1 or mtr2, which is an upper limit, and the motor limit torque mtr3, which is a lower limit. Whereas, when the motor command torque mtr exceeds (is more than) the motor limit torque mtr1 or mtr2, which the upper limit, the motor command torque limiter unit 28 outputs the motor limit torque mtr1 (in the case of the brake override) or the motor limit torque mtr2 (in the case of the usual driving), which is the upper limit, to the inverter as the motor command torque mtr4. When the motor command torque mtr passes under (falls below, is less than) the motor limit torque mtr3, which is the lower limit, the motor command torque limiter unit 28 outputs the motor limit torque mtr3, which is the lower limit, to the inverter as the motor command torque mtr4.

The inverter controls power supplied to the motor so that an output torque of the motor serving as a driving source of the electric vehicle becomes the motor command torque mtr4. Therefore, at time of the brake override, an upper limit of the output torque of the motor is limited to be the motor limit torque mtr1 adjusted by the motor limit torque map unit 24.

Herein, based on FIGS. 2A to 2D, motor limit torque maps used in the motor limit torque map unit 24 will be described.

Figure 2A:
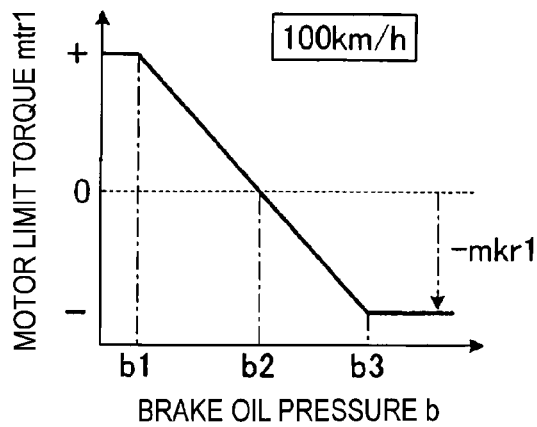
FIGS. 2A to 2D are diagrams illustrating motor limit torque maps used in the motor torque control device.
Figure 2B:
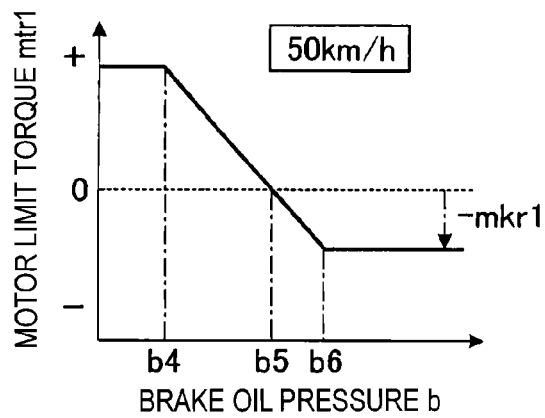
Figure 2C:
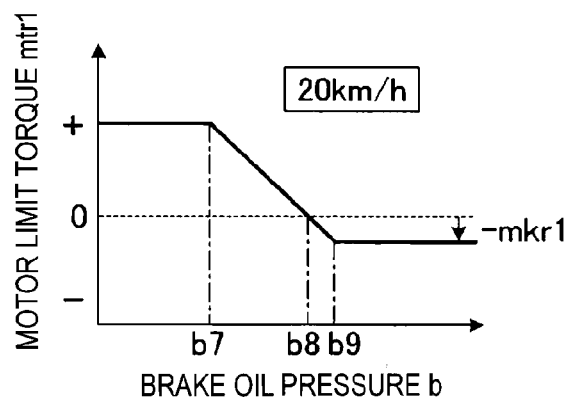
Figure 2D:
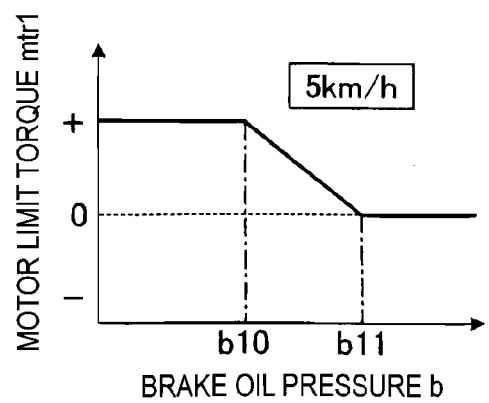

As an example of a motor limit torque map, a motor limit torque map when the vehicle velocity v is 100 km/h is shown in FIG. 2A, a motor limit torque map when the vehicle velocity v is 50 km/h is shown in FIG. 2B, a motor limit torque map when the vehicle velocity v is 20 km/h is shown in FIG. 2C, and a motor limit torque map when the vehicle velocity v is 5 km/h is shown in FIG. 2D.

As shown in FIG. 2A, when the vehicle velocity v is 100 km/h, the motor limit torque mtr1 is maintained constantly until the brake oil pressure b becomes b1. From the time when the break oil pressure b becomes b1, the motor limit torque mtr1 decreases as the brake oil pressure b increases. The motor limit torque mtr1 decreases until the brake oil pressure b becomes b3, and from the time when the break oil pressure b becomes b3, the motor limit torque mtr1 is maintained constantly. When the motor limit torque mtr1 decreases between b1 and b3, the motor limit torque mtr1 becomes a negative value (deceleration torque) from the time when the brake oil pressure b becomes b2. As the brake oil pressure b increases, a value of the negative motor limit torque mtr1 (an absolute value) increases. When the negative motor limit torque mtr1 is outputted to the inverter as the motor command torque mtr4, the inverter controls the output torque of the driving motor to be the negative motor limit torque mtr1 (deceleration torque) (i.e., a regenerative braking torque is generated in the driving motor).

As shown in FIG. 2B, when the vehicle velocity v is 50 km/h, the motor limit torque mtr1 is maintained constantly until the brake oil pressure b becomes b4. From the time when the break oil pressure b becomes b4, the motor limit torque mtr1 decreases as the brake oil pressure b increases. The motor limit torque mtr1 decreases until the brake oil pressure b becomes b6, and from the time when the break oil pressure b becomes b6, the motor limit torque mtr1 is maintained constantly. When the motor limit torque mtr1 decreases between b4 and b6, the motor limit torque mtr1 becomes a negative value (deceleration torque) from the time when the brake oil pressure b becomes b5. As the brake oil pressure b increases, a value of the negative motor limit torque mtr1 (an absolute value) increases.

As shown in FIG. 2C, when the vehicle velocity v is 20 km/h, the motor limit torque mtr1 is maintained constantly until the brake oil pressure b becomes b7. From the time when the break oil pressure b becomes b7, the motor limit torque mtr1 decreases as the brake oil pressure b increases. The motor limit torque mtr1 decreases until the brake oil pressure b becomes b9, and from the time when the break oil pressure b becomes b9, the motor limit torque mtr1 is maintained constantly. When the motor limit torque mtr1 decreases between b7 and b9, the motor limit torque mtr1 becomes a negative value (deceleration torque) from the time when the brake oil pressure b becomes b8. As the brake oil pressure b increases, a value of the negative motor limit torque mtr1 (an absolute value) increases.

As shown in FIG. 2D, when the vehicle velocity v is 5 km/h, the motor limit torque mtr1 is maintained constantly until the brake oil pressure b becomes b10. From the time when the break oil pressure b becomes b10, the motor limit torque mtr1 decreases as the brake oil pressure b increases. The motor limit torque mtr1 decreases until the brake oil pressure b becomes b11, and from the time when the break oil pressure b becomes b11, the motor limit torque mtr1 is zero.

Characteristics of the motor limit torque map of the present exemplary embodiment will be described below.

That is, as the vehicle velocity v increases to 5 km/h, 20 km/h, 50 km/h, and 100 km/h, the stepping amount b of the brake pedal at the time of starting to decrease the motor limit torque mtr1 decreases to b10, b7, b4, and b1 (b10>b7>b4>b1).

As the vehicle velocity v increases to 5 km/h, 20 km/h, 50 km/h, and 100 km/h, a maximum value (−mtr1) of a negative side of the motor limit torque mtr1 increases.

When the vehicle velocity v is a velocity other than 100 km/h, 50 km/h, 20 km/h, and 5 km/h, a relationship (map) between the brake oil pressure b and the motor limit torque mtr1 in the velocity is acquired through interpolation based on the motor limit torque maps of 100 km/h, 50 km/h, 20 km/h, and 5 km/h.

As described above, according to the motor torque control device of the present exemplary embodiment, by using the motor torque control device limiting the output of the motor when both the brake pedal 5 and the accelerator pedal 6 are stepped in the electric vehicle equipped with the motor as the driving source, the motor limit torque mtr1, which is the upper limit value of the command torque mtr for the motor, is changed depending on the vehicle velocity v detected by the vehicle velocity sensor 1 (the vehicle velocity detecting unit) and the brake oil pressure b (corresponding to the brake pedal stepping amount) detected by the brake oil pressure sensor 3 (the brake pedal stepping amount detecting unit). As a result, the motor limit torque mtr1 is adjusted depending on the vehicle velocity v and the brake oil pressure b (the brake pedal stepping amount) to thereby acquire appropriate driving performance depending on a driving condition as compared with the case where the motor output is just limited to a predetermined output. For example, even in the case where the stepping amount of the accelerator pedal 5 does not return to zero, since the motor limit torque mtr1 is changed depending on the vehicle velocity v and the brake oil pressure b (the brake pedal stepping amount), the electric vehicle can be continuously driven to move to a safety zone.

According to the motor torque control device of the exemplary embodiment, as the brake oil pressure b (the brake pedal stepping amount) increases, the motor limit torque mtr1 is adjusted to decrease, and as a result, more appropriate driving performance depending on the driving condition can be acquired. For example, when the driver deeply steps on the brake pedal 6 in order to decelerate the vehicle in an early stage, the motor limit torque mtr1 decreases depending on the stepping amount, and as a result, the deceleration suitable for the driver's intention can be implemented.

According to the motor torque control device of the exemplary embodiment, as the vehicle velocity v increases, the brake oil pressure b (the brake pedal stepping amount) at the time of starting to decrease the motor limit torque mtr1 is adjusted to decrease, and as a result, more appropriate driving performance depending on the driving condition can be acquired. For example, since even low brake oil pressure b (small stepping amount) decreases the motor limit torque mtr1 (strengthens the limitation of the motor output) at a high vehicle velocity, it can be ensured that the vehicle can be prevented from running away. Since higher brake oil pressure b (larger stepping amount), compared with that of the high vehicle velocity, decreases the motor limit torque mtr1 at a low vehicle velocity, the vehicle can move rapidly.

According to the motor torque control device of the exemplary embodiment, when the brake oil pressure b (the brake pedal stepping amount) is equal to or more than a predetermined value, the motor limit torque mtr1 is a negative value or zero, and as a result more appropriate driving performance depending on the driving condition can be acquired. That is, when the driver deeply steps on the brake pedal 6 in order to decelerate or stop the vehicle in an early stage, the motor limit torque mtr1 becomes a negative value (deceleration torque) or zero, and as a result, the vehicle can be decelerated or stopped in an early stage according to the driver's intention. Even though a hydraulic brake apparatus is faulty (including fading), the vehicle can be stopped.

According to the motor torque control device of the exemplary embodiment, as the brake oil pressure b (the brake pedal stepping amount) increases, the negative value of the motor limit torque mtr1 is adjusted to increase, and as a result, even though a deceleration torque is generated in the motor by setting the motor limit torque mtr1 to the negative value, the motor limit torque mtr1 decreases depending on the brake oil pressure b (the brake pedal stepping amount), and as a result, deceleration and stopping operations can be more smoothly performed.

According to the motor torque control device of the exemplary embodiment, as the vehicle velocity v increases, the maximum value (−mtr1) at the negative side of the motor limit torque mtr1 is adjusted to increase, and as a result, as the vehicle velocity v increases, a larger deceleration torque can be generated. Thus, for example, it can be ensured that the vehicle can be prevented from running away.

The motor torque control device according to the exemplary embodiment of the present invention is not limited to the electric vehicle equipped with the motor serving as the driving source but may be applied to an electrically-driven vehicle such as a hybrid electric vehicle equipped with the motor and the engine as the driving source.

The present invention relates to a motor torque control device and is useful when a brake override system is mounted on an electrically-driven vehicle such as an electric vehicle or a hybrid electric vehicle.

What is claimed is:

1. A motor torque control device of an electrically-driven vehicle equipped with a motor serving as a driving source, wherein the motor torque control device is configured to limit an output of the motor when both a brake pedal and an accelerator pedal of the electrically-driven vehicle are stepped, and to change an upper motor limit torque, which is an upper limit value of a command torque for the motor, depending on a vehicle velocity of the electrically-driven vehicle detected by a vehicle velocity detecting unit, and on a stepping amount of the brake pedal detected by a brake pedal stepping amount detecting unit, wherein when the command torque exceeds the upper motor limit torque, the upper motor limit torque is output as the command torque, when the command torque falls below a lower motor limit torque, the lower motor limit torque is output as the command torque, and when the command torque is between the upper motor limit torque and the lower motor limit torque, the command torque is output, wherein the motor torque control device is configured to change a value of the upper motor limit torque between a positive value and a negative value depending on the vehicle velocity and the stepping amount of the brake pedal.

2. The motor torque control device according to claim 1, wherein the motor torque control device is configured to decrease the upper motor limit torque as the stepping amount of the brake pedal increases.

3. The motor torque control device according to claim 2, wherein the motor torque control device is configured to decrease a threshold of the stepping amount of the brake pedal that triggers a time when the upper motor limit torque starts to decrease as the vehicle velocity increases.

4. The motor torque control device according to claim 2, wherein the motor torque control device is configured to change the upper motor limit torque to a negative value or zero when the stepping amount of the brake pedal is equal to or more than a predetermined value.

5. The motor torque control device according to claim 4, wherein the upper motor limit torque is the negative value, and the motor torque control device is configured to increase an absolute value of the negative value of the upper motor limit torque as the stepping amount of the brake pedal increases.

6. The motor torque control device according to claim 5, wherein the motor torque control device is configured to increase a maximum value of a negative side of the upper motor limit torque as the vehicle velocity increases.

* * * * *